United States Patent
Best

[11] Patent Number: 6,114,666
[45] Date of Patent: Sep. 5, 2000

[54] HEATING ASSEMBLY AND COOKING APPARATUS

[76] Inventor: Willie H. Best, 1829 Senate St., 10-C, Columbia, S.C. 29201

[21] Appl. No.: 09/345,870

[22] Filed: Jul. 1, 1999

Related U.S. Application Data

[60] Provisional application No. 60/091,581, Jul. 2, 1998.

[51] Int. Cl.[7] .................. A47J 37/06; F24C 1/08; F24C 7/06
[52] U.S. Cl. .............. 219/411; 219/399; 126/39 BA; 126/39 D
[58] Field of Search .................. 219/399, 409, 219/411, 530, 540; 392/432, 435; 126/39 BA, 39 C, 39 D, 39 J, 22

[56] References Cited

U.S. PATENT DOCUMENTS

| | | | |
|---|---|---|---|
| 3,155,814 | 11/1964 | Appleman | 219/399 |
| 3,586,825 | 6/1971 | Hurley | 126/39 J |
| 3,663,798 | 5/1972 | Speidel et al. | 126/39 J |
| 3,941,117 | 3/1976 | Pei et al. | 126/39 J |
| 4,024,839 | 5/1977 | Reid, Jr. et al. | 126/39 J |
| 4,057,670 | 11/1977 | Scheidler | 219/464 |
| 4,207,456 | 6/1980 | Best | 392/433 |
| 4,321,857 | 3/1982 | Best | 126/39 C |
| 4,575,616 | 3/1986 | Bergendal | 219/411 |
| 4,798,192 | 1/1989 | Maruko | 126/91 A |
| 4,839,502 | 6/1989 | Swanson et al. | 219/411 |
| 4,886,044 | 12/1989 | Best | 126/39 C |
| 4,960,977 | 10/1990 | Alden | 219/411 |
| 5,024,209 | 6/1991 | Schaupert | 126/39 J |
| 5,028,760 | 7/1991 | Okuyama | 219/530 |
| 5,509,403 | 4/1996 | Kahlke et al. | 126/39 J |
| 5,582,094 | 12/1996 | Peterson et al. | 99/445 |
| 5,823,099 | 10/1998 | Ko | 219/411 |

FOREIGN PATENT DOCUMENTS

221686  5/1987  European Pat. Off. .

*Primary Examiner*—Joseph Pelham
*Attorney, Agent, or Firm*—Womble Carlyle Sandridge & Rice, PLLC

[57] ABSTRACT

A cooking apparatus (10) having a body (13) defining a chamber (23), includes a heating assembly (31) mounted within the chamber (23). The heating assembly (31) includes a burner (32) and an infrared radiant energy emitter (33) positioned above burner (32). The emitter (33) absorbs energy from the burner (32) and emits infrared radiant energy. The infrared radiant energy is directed at and is used to cook food supported on a cooking grid (70) above the infrared radiant energy emitter (33).

20 Claims, 5 Drawing Sheets

HEATING ASSEMBLY AND COOKING APPARATUS

REFERENCE TO RELATED APPLICATION

This application claims priority to U.S. Provisional application serial No. 60/091,581 filed Jul. 2, 1998.

FIELD OF THE INVENTION

The present invention relates generally to an apparatus and process for cooking food items. In particular, the present invention relates to a cooking apparatus having an infrared cooking assembly.

BACKGROUND OF THE INVENTION

Cooking on grills such as barbecue grills generally is done by impringing a flame against ceramic briquettes or various types of metal surfaces, typically using propane, natural gas or charcoal as an energy source or fuel for combustion. When food is cooked on a grill, it is desirable first to sear the outside of the food to lock in the juices and further to cook the food as evenly as possible to avoid having the outer portions of the food burned while the inner portions are left uncooked. In most conventional grills, the food is cooked primarily using hot gases created by the flames and products of combustion from the burning of the fuel heating the ambient air within the grill.

Unlike cooking with heated gases, as done with most conventional grills, cooking with infrared radiation enables more even heating over the surface of the food so the food can be cooked evenly, with the outside first being seared. In most conventional grills, however, there typically is very little infrared radiation generated. Conventional grills include ceramic briquettes or "lava rocks" designed to be heated by burning the gas/fuel to radiate heat. Such ceramic briquettes, however, tend to generate little infrared energy and possess poor thermal conductivity, which limits the conduction of heat throughout the briquettes. Also these briquettes possess poor thermal inertia. As a result of the poor thermal inertia of the briquettes, as liquids impinge and evaporate on the surface of the briquettes, the briquettes are cooled below the ignition temperature of the oils that drip from the food onto the briquettes. As oils and/or liquids drip from the food, they tend to be absorbed into the ceramic briquettes and build up on the briquettes, which buildup can ignite and cause flame flare ups. Accordingly, such ceramic briquettes generally have to be changed at periodic intervals. Some conventional grills utilize metal plates that are impinged and heated by the flames and products of combustion. Such metal plates, however, also are poor emitters of infrared radiation, and generally are used, as with the ceramic briquettes, for the purpose of evaporating juices and incinerating fats that fall upon them from the cooking meats to create vapors that are then directed over the surfaces of the food to impart an "outdoor" or smoked flavor.

Gas grills have been developed which utilize under-fired burner assemblies designed specifically to generate infrared radiant energy for cooking food. For example, U.S. Pat. Nos. 4,321,857 and 4,886,044 to Best disclose infrared gas grills which cook food using infrared radiant energy. In addition, electric cooking units, including overhead type broilers and ovens, also use infrared radiant energy for cooking foods. In cooking with infrared radiant energy, infrared radiant energy having longer wavelengths is readily absorbed within the surface of the food to generate heat that is conducted inwardly, resulting in the surface of the meat being rapidly seared to seal in the juices while the meat is cooked from the outside toward the center. One problem with conventional under-fired infrared grills and other cooking devices generally is that these devices can have a low level of thermal inertia or have a heating element that is positioned out of contact with the juices and fats that drip from the meat or other food being cooked, such that the juices and fats are not vaporized or burned to create vapors that pass over the food to impart flavor.

In addition, in gas grills using an infrared radiant heating or burner element, the burner element usually is formed from a ceramic material. Similarly in the case of overhead broilers, a glass or ceramic type coating has been used to cover the emitting surface in some applications. For example, Japanese Patent No. JP 57000430A discloses an overhead burner with a glass or ceramic type coating. Conventional under-fired burners are, however, subject to failure if they become wet as water is absorbed into the ceramic elements, which causes the elements to swell, ultimately leading to failure of the ceramic element. Another problem with an infrared radiant grill is employing a ceramic emitter that can be susceptible to the effects of wind and rain, which can cause the combustion of gas by the burner elements to be diminished, affecting the cooking of the food by the grill. A further limitation of such burner elements is that the turn-down ratio from high fire to low fire is generally limited, since most radiant ceramic burners usually will not operate efficiently below a surface temperature of about 1100° F. without becoming unstable. In the cooking of meats such as steak, a high fire generally is desired. When it is necessary to cook more slowly over lower heats, however, such lower heats are often difficult to achieve and maintain because of the limited turn-down ability of such burners. According, it can be seen that a need exists for an improved cooking apparatus that overcomes these and other problems in the art.

SUMMARY OF THE INVENTION

The present invention comprises a heating assembly and cooking apparatus for cooking foods using infrared radiant energy. The invention includes a cooking apparatus, such as a grill having an upright cabinet formed from sheet metal such as steel and including a base or pedestal and a grill body. The grill body includes a series of parallel side walls, an open upper end, and a lower end, which define an open chamber. A hood can be rotatably mounted to the grill body to be movable between open and closed positions for exposing and enclosing the cooking apparatus.

The grill body further includes a heating element that is mounted adjacent its bottom or lower end. The heating element includes a gas fired radiant burner assembly that burns a combustible mixture of propane or natural gas and air, or can include an electric heating element. The burner assembly includes a burner body that defines a burner chamber or plenum that contains ports for the passage of the gas air mixture to allow the gas and air mixture to be burned at the exit of the ports. The burner plenum also can contain a ceramic element on which combustion of the gas air mixture occurs on the surface, to heat the ceramic element to temperatures that will provide for the ceramic element to emit substantial levels of infrared radiant energy. A venturi tube is connected at one end to a gas supply line and is extended through a side wall of the burner body for injecting a combustible mixture of gas and air into the burner body. A throttling valve is mounted at the juncture between the gas supply line and the venturi tube for controlling the flow of gas into the venturi tube.

The burner assembly also can include a burner element that is mounted above the open upper end of the burner body. Such a burner element generally includes a series of burner plates formed from a ceramic material, having a series of ports, holes or passageways formed therein for allowing passage of a combustible mixture of air and gas for ignition and burning on the upper surface of the ceramic burner element. An infrared radiant energy emitter element is mounted in a spaced relationship above and substantially covers the burner element. The infrared emitter generally is a sheet or plate formed from a heat resistant glass material, a ceramic-glass or a material coated with a ceramic-glass or glass material capable of withstanding temperatures of 800° F.–1400° F. or greater, and substantially covers the burner head element. The emitter however, could be heated by an electric heating element. The infrared emitter is heated by the burner element through the absorption of infrared energy (when an electric heating element contacting the glass emitter is used), conducted heat energy, convective heat energy or a combination thereof, typically being heated to temperatures of over 800° F. when operated at the highest energy input. The infrared emitter then emits infrared radiant energy that is directed upwardly toward the food being cooked. Typically, more than 50 percent of the emitted infrared radiant energy being emitted by the infrared emitter is emitted at wavelengths of 3 microns or greater, with the average emissivity of the emitter for all wavelengths being approximately 0.8 or greater. As a result, the foods being cooked, i.e., meats, are seared on the outside and are heated toward the center of the food to permit substantially even cooking.

The glass or ceramic-glass material also has a sufficient thermal inertia to enable the glass/ceramic-glass material to absorb and store energy therein. Preferably, the infrared emitter will be capable of storing between approximately 0.2 Btuh/Ft$^2$/° F. to 1.0 Btuh/Ft$^2$/° F., which is dependent upon the weight per square foot of the emitter and its specific heat. Glass emitters with a thickness of $\frac{1}{8}$ to $\frac{1}{4}$ inch have been found to be acceptable. Thus, the infrared emitter will absorb sufficient heat to burn off or vaporize oils, juices and other drippings from the food, which vapors will be directed back to the food to add additional flavor. The glass/ceramic-glass material of the infrared emitter also is substantially resistant to thermal shock, to avoid cracking or breaking upon being contacted with liquids during cooking. The infrared emitter thus protects the burner head assembly from contact with liquids, and further substantially covers and renders the burner head assembly substantially wind and waterproof.

A cooking grid comprising one or more cooking grates, are removably mounted at the upper ends of the side walls of the grill body in a position spaced above the infrared emitter. The cooking grates are formed from a high temperature material such as stainless steel, and include a series of longitudinally extending bars or channels spaced from one another to define gaps or passages therebetween. The cooking grates support the food being cooked above the infrared emitter, and allow fats and oils and other material to fall through the gaps or passages in the grates on to the infrared emitter below. As such fats and juices impinge upon the infrared radiant energy emitter, they are vaporized, which vapors are directed back toward the food to impart flavor to the food.

Various objects, features and advantages of the present invention will become apparent to those skilled in the art upon a review of the following specification, when taken in conjunction with the accompanying drawings.

DETAILED DESCRIPTION

Figure 1:
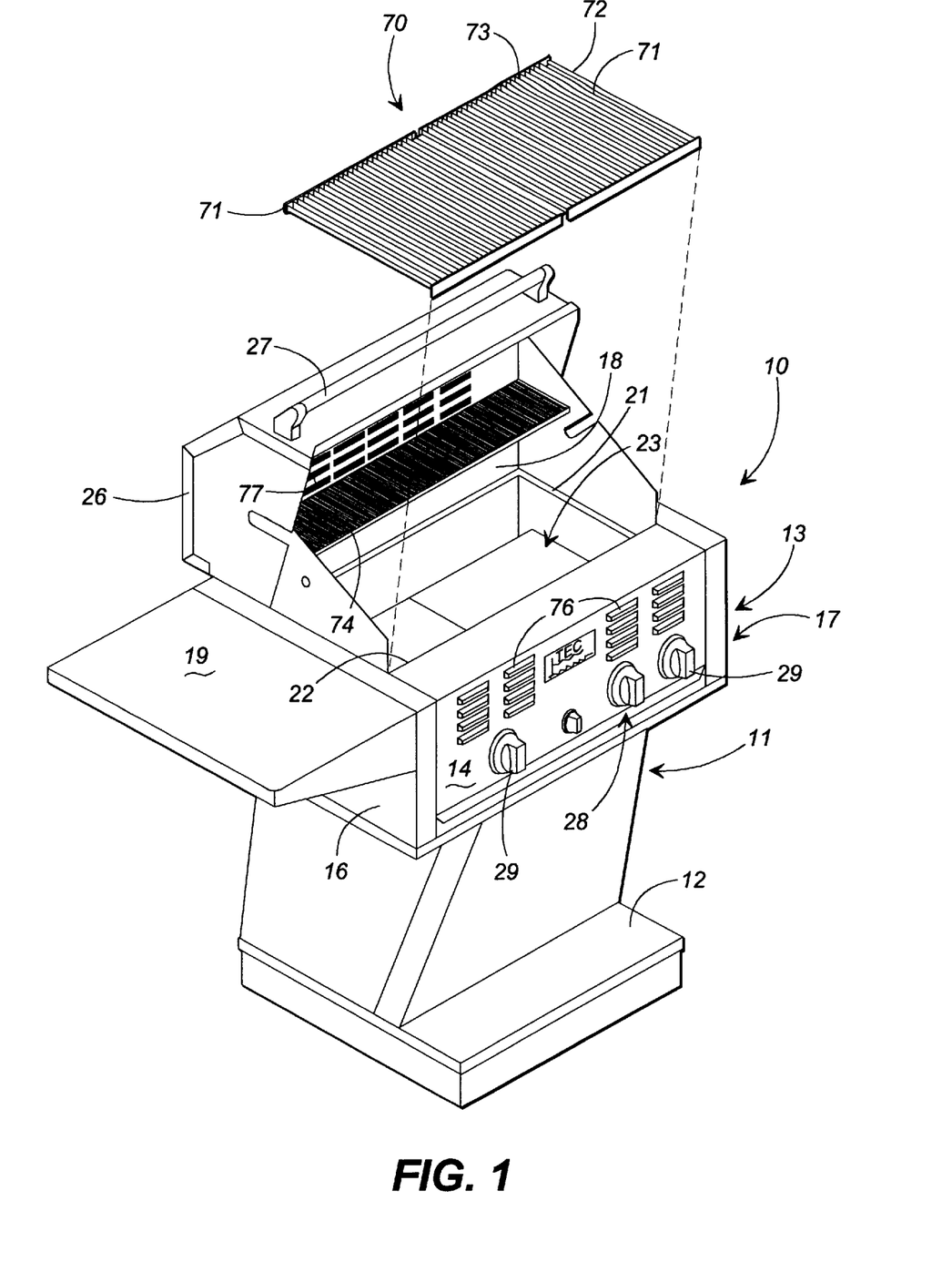
FIG. 1 is a perspective view of a cooking apparatus incorporating the burner assembly of the present invention.

Referring to the drawings in which like numerals indicate like parts throughout the several views, FIG. 1 illustrates a cooking apparatus 10, here illustrated in one preferred embodiment as a grill assembly, for cooking foods, such as meats. It also will be understood by those skilled in the art that the present invention can be incorporated into other types of cooking devices, such as ovens and stove assemblies for indoor and outdoor cooking. The cooking apparatus 10 includes an upstanding cabinet 11 formed from sheet metal, such as stainless steel or aluminum. The cabinet 11 has a base or pedestal 12 and a grill body 13 having a front panel 14, side panels 16 and 17 and rear panel 18 formed from a heat resistant material such as steel or aluminum so as to form a heat shield for the cooking apparatus. One or more shelves 19 can be mounted on the sides of the grill body.

The grill body includes an open upper end 21 (FIG. 2) and a bottom end 22 and defines an open chamber 23. The food to be cooked is supported and received adjacent the upper end of the cooking area, where it is exposed to heat in the form of infrared radiant energy for cooking the food. A heat shield 24, formed from steel or similar heat resistant material, includes a series of upstanding panels 25 are positioned within the cooking chamber to contain the heat (FIG. 2).

A hood 26 can be pivotably mounted to the rear side of the grill body 13 (FIG. 1). The hood is formed from the same metal material, i.e., steel or aluminum, as the cabinet and grill body, and includes a handle 27. The hood is movable between open and closed positions over the cooking chamber to enable and restrict access to the cooking chamber. Cooking controls 28, illustrated as a series of knobs 29, are mounted along the front panel 14 of the grill body 13 for controlling the cooking temperatures generated within the cooking apparatus as needed for cooking different meats or foods by controlling the flow of fuel to the heating element.

Figure 2:
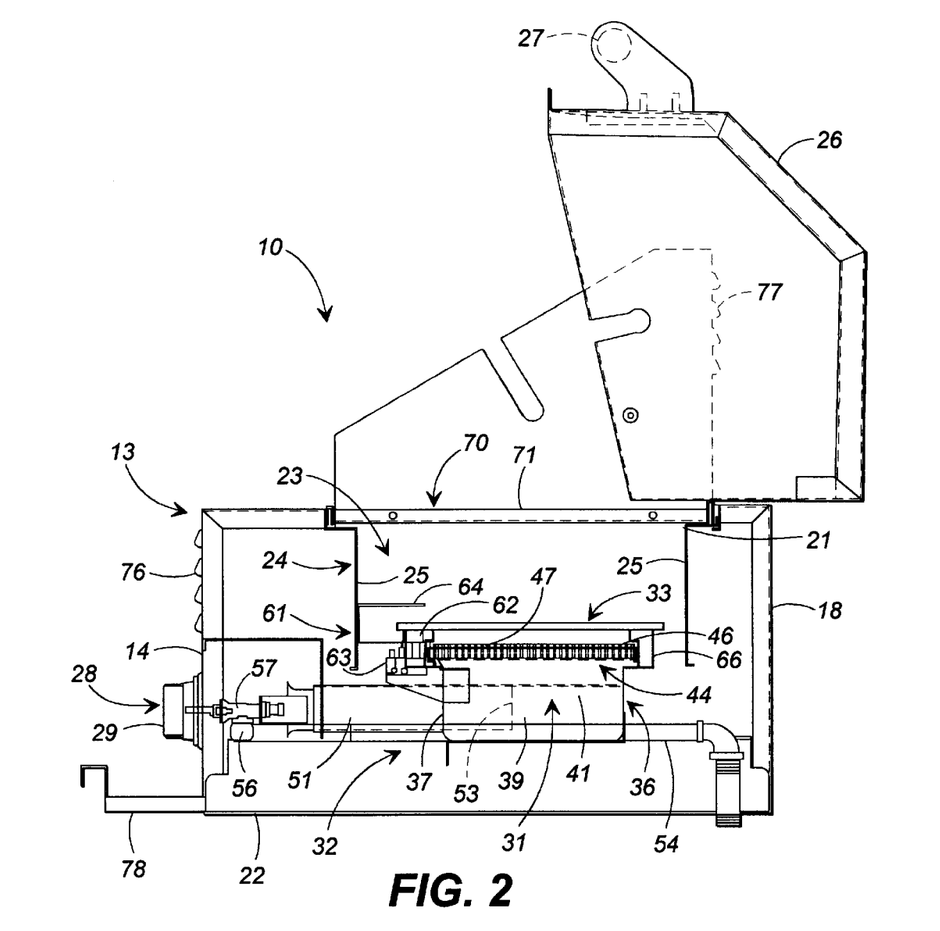
FIG. 2 is a cross sectional end view of the grill body with the burner assembly of the present invention.
Figure 3:
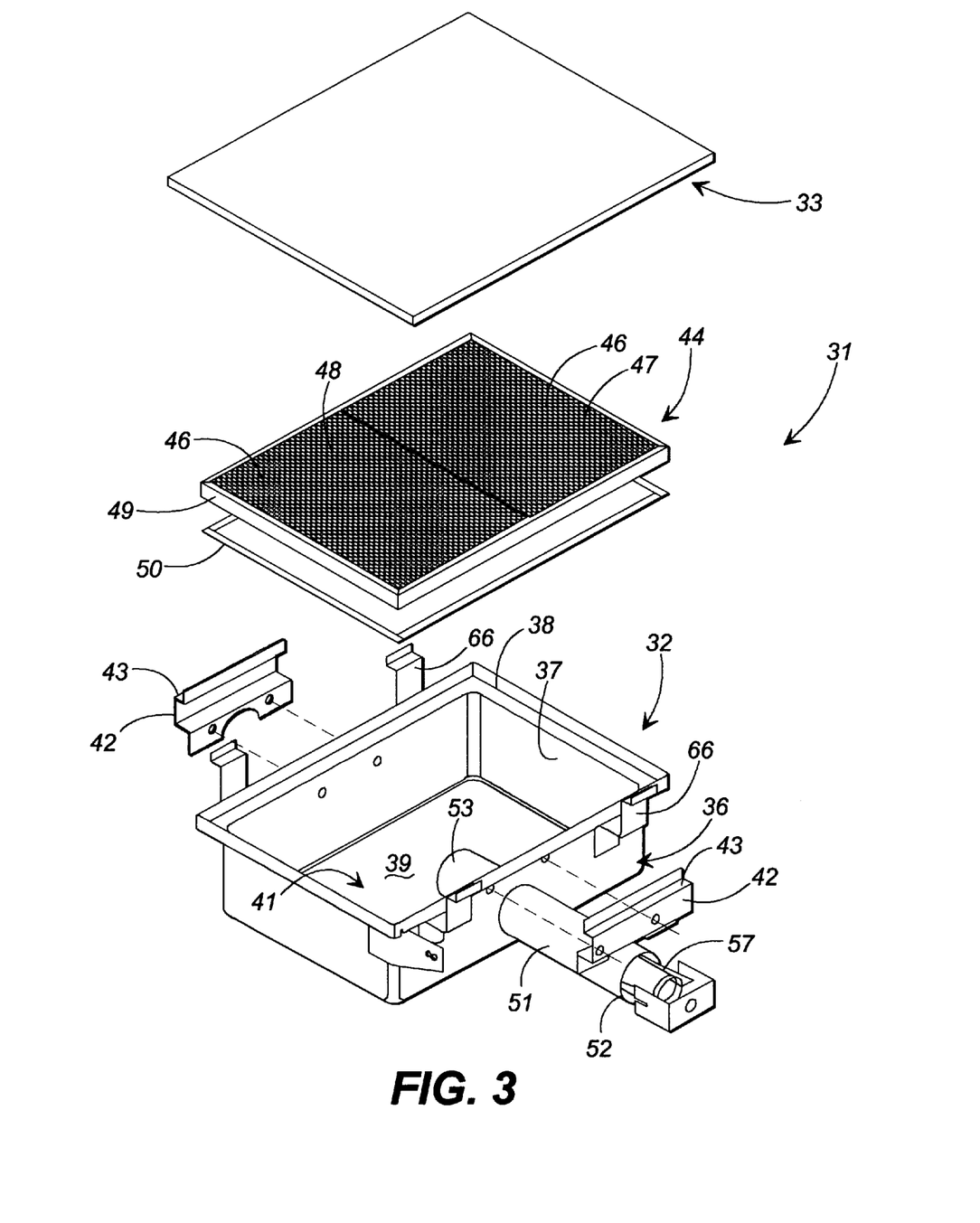
FIG. 3 is an exploded perspective view of the infrared radiant energy emitter and burner assembly of the present invention.
Figure 4:
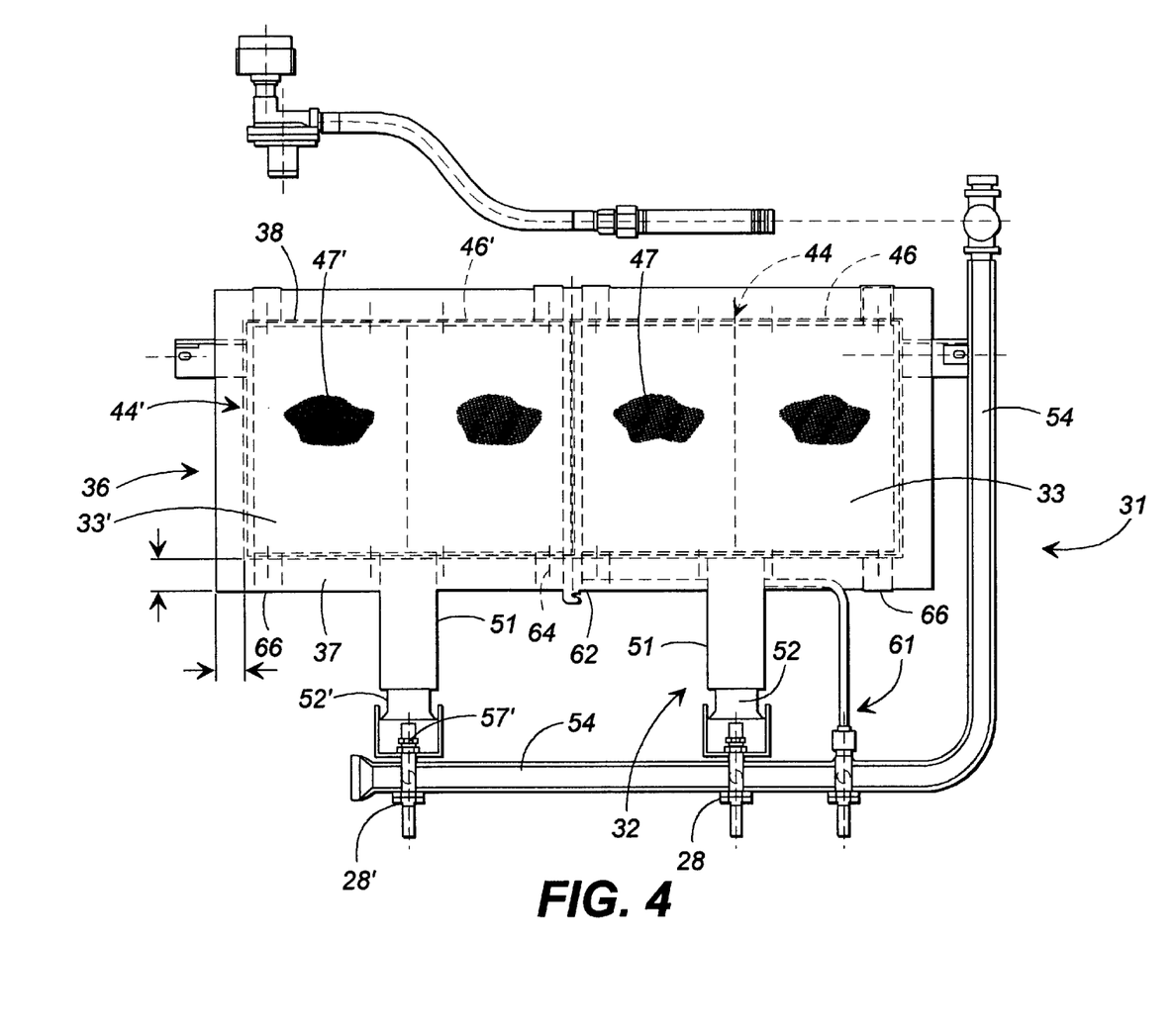
FIG. 4 is a plan view of the infrared radiant emitter and burner assembly in partial cross section.

FIGS. 2–4 illustrate a heating assembly 31 for the cooking apparatus 10 of the present invention, which typically includes a radiant burner assembly 32 and infrared radiant energy emitter 33. The heating assembly comprises a radiant infrared gas burner assembly, such as disclosed in U.S. Pat. Nos. 4,321,857 and 4,886,044 to Best, connected to a fuel supply (not shown) that supplies a fuel, typically in the form of a gas, such as propane or natural gas. The fuel is mixed with air in a venturi to form a combustible mixture that is burned to generate heat energy. It will also be understood by those skilled in the art that other types of heating elements such as electric heating coils or similar devices also can be used for generating heat energy within the cooking assembly.

The burner assembly 32 (FIGS. 2 and 3) includes a burner body 36 formed from a metal such as steel or aluminum, mounted at the open bottom or lower end 22 of the grill body 13 (FIG. 2). The burner body 36 (FIG. 3) includes opposed side walls 37, an open upper end 38 and a bottom wall 39 defining a burner chamber 41. Burner support brackets 42 are mounted to, for example, two opposed side walls 37 of the burner body. The burner support brackets are substantially C-shaped, and include substantially flat upper flange portions 43. The upper flange portions 43 receive and support a burner head assembly 44.

The burner head assembly 44 includes one or more burner plates 46. The burner plate(s) 46 are formed from a ceramic material having a series of ports or passages 47 formed therein, such as disclosed in U.S. Pat. Nos. 4,321,857 and 4,886,044. The combustible mixture of gas and air is conducted through these ports to the upper surface 48 of the burner plates, where it is ignited and burned to generate heat. The ceramic burner plates also act as an insulator to restrict conduction of heat back to the burner body. A rim or frame 49 is mounted around the periphery of the burner plates to hold the burner plates together as a unitary assembly. A burner head gasket 50, formed from a heat resistant material such as a fibrous ceramic material such as FIBERFAX™, is received between the burner plate(s) 46 and upper flange portions 43 of burner support brackets 42 to seat and seal the burner plates on the burner support brackets.

FIG. 3 illustrates a venturi tube 51 extended through a front side wall 37 of the burner body 36. The venturi tube is formed from steel or similar material, and includes a distal end 52 outside the burner body and a proximal, open end 53 positioned inside the burner chamber 41. The distal end 52 communicates with a gas supply line 54 (FIG. 4), which is connected to the gas supply (not shown), at a manifold 56 (FIG. 2) for supplying gas to the venturi tube 51. A throttling valve 57 is mounted at the juncture between the venturi tube and gas supply line adjacent the manifold 56. The throttling valve is connected to the cooking controls 28 (FIG. 2) for controlling the flow of fuel into the venturi tube where the fuel is mixed with air to form a combustible air/gas mixture.

As FIG. 4 illustrates, multiple burner assemblies also can be interconnected in series to the manifold and gas supply line. Such multiple burner assemblies can have separate controls 28 and 28' for controlling the heats/temperatures generated at such burner assemblies. The multiple burner assemblies thus can form separate cooking areas with separate cooking controls for cooking different foods at varying temperatures.

Figure 5A:
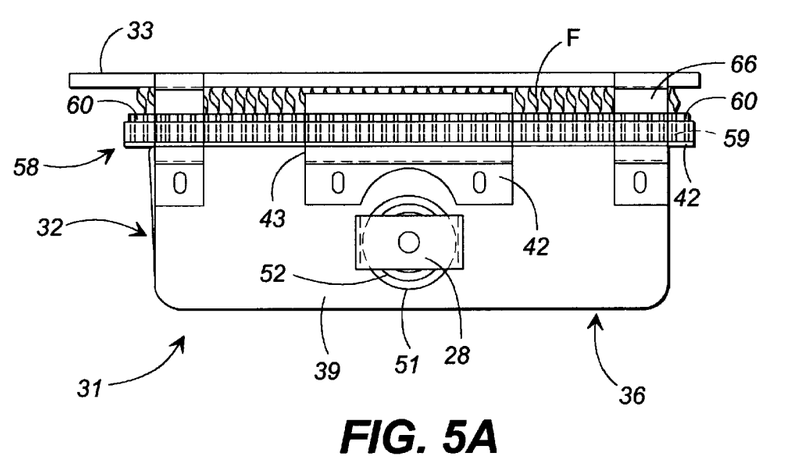
FIG. 5A is a side elevational view schematically illustrating an alternative burner assembly.
Figure 5B:
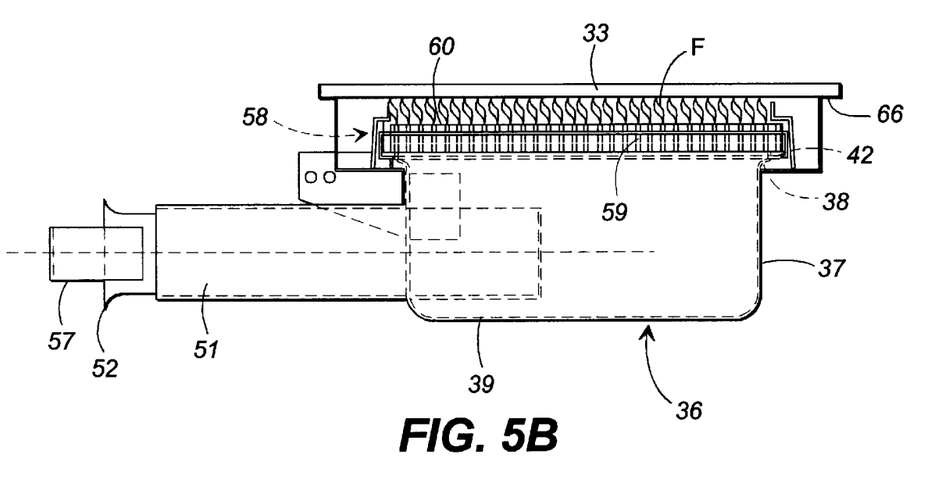
FIG. 5B is an end view schematically illustrating the alternative burner assembly of FIG. 5A.

FIGS. 5A and 5B illustrate the use of a conventional flame type burner assembly 58. Burner assembly 58 includes a ceramic or metal grate block 59 having a series of ports, openings or slots formed therein mounted to the upper end of the burner body. A combustible fuel/air mixture is ignited and burned at or above the grate with the flames F projecting above the upper surface 60 of the grates 59. As shown in FIGS. 5A and 5B, the flames impinge upon and heat the infrared radiant emitter.

An ignition assembly 61 (FIGS. 2 and 4) is provided adjacent the upper end 38 of the burner body 36. The ignition assembly includes a pilot burner 62 that receives and burns a portion of the gas supplied through the manifold. A shield 64 formed from a steel or similar corrosion resistant material is mounted over the pilot burner 62, as shown in FIG. 2, to protect the pilot from drippings of fats, oils, etc. from the food being cooked. The ignitor assembly ignites the combustible mixture of air and gas passing through the burner plates 46 for generating heat energy.

As FIGS. 2 and 3 illustrate, the infrared radiant energy emitter 33 is positioned in a spacial relationship with respect to the upper surface 48 of the burner plates, typically spaced between ¼ to 3½ inches above the upper surface of the burner plates. Since combustion of the gas/air mixture is done substantially on or slightly below the upper surface of the burner plates, the infrared emitter can be placed in close proximity to the upper combustion surface of the burner plates, i.e., less than one inch from the upper surface. The infrared emitter is supported above the burner plates on support brackets 66 (FIG. 2) that maintain the emitter in a spaced position above the burner plates, with the infrared emitter being sized and shaped to substantially cover and protect the burner plates from oils, juices and other drippings form the food being cooked. The infrared emitter preferably comprises a solid surface sheet or plate of a silica glass material, such as manufactured by Owens-Corning Corp., Corning, N.Y. under the trade name VICOR, or a ceramic-glass material, such as manufactured under the trade name CERAN. The glass or ceramic-glass material selected generally has an average emissivity of 0.8 or move over the range of wavelengths emitted, and is able to withstand temperatures of up to 800° F. to 1400° F. or greater.

The infrared emitter 33 absorbs heat energy generated within the burner chamber 41 in the form of convective heat energy, conducted heat energy, infrared radiant energy or a combination thereof, which causes the infrared emitter to be heated to temperatures ranging from 300° F. to 1350° F. over a full range of operating temperatures. Approximately 85% of the infrared energy absorbed by the emitter 33 from the infrared burner, is re-radiated due to its own temperature and emissivity at longer wavelengths than that of the absorbed energy. The remaining radiant energy absorbed is transmitted directly through the glass. Approximately 50% or more of the infrared radiant energy re-radiated, is emitted at wavelengths of approximately 3 microns or greater. The large surface area of the burner plates over which combustion occurs provides a method by which the energy from the radiant burner, i.e., convection and thermal/infrared radiation, can be uniformly transferred to the emitting element.

The glass/ceramic-glass material of the infrared emitter further has a low coefficient of expansion so as to be substantially thermally shock resistant such that it will not be cracked or damaged by water or other liquids coming in contact with it after the emitter is heated. This resistance to thermal shock further enables water to be applied to the surface of the infrared emitter while it is heated, for cleaning the infrared emitter surface. During the cooking process, if carbon deposits develop from incineration of the fats on the surface, they can be removed by pouring water onto the hot emitting surface. By rapidly cooling the carbon spots, the adhesion between the emitter and the carbon is broken, and the carbon washes away from the emitter surface down into the drip tray located below the burners. As a result, with the infrared emitter positioned over and substantially covering the burner plates of the burner head assembly, the burner plates are shielded or protected from contact with oils and/or liquids dropping from the food to render the burner head assembly substantially waterproof.

The glass/ceramic-glass of the infrared emitter further has sufficient thermal inertia to enable the infrared emitter to absorb and store heat energy. Preferably, the stored energy will be between approximately 0.2 $Btuh/ft^2/°$ F. to 1.0 $Btuh/ft^2/°$ F., although it will be understood that the material of the infrared emitter can be selected to store greater or lesser amounts of energy as desired. As the infrared emitter absorbs and stores this heat energy, the upper surface of the infrared emitter is heated to sufficiently high temperatures and will burn off/incinerate debris collected thereon to clean the infrared emitter. For example, if the combined specific heat and wt./ft$^2$ of the infrared emitter is 0.5 Btuh/ft$^2$/° F., and the emitter temperature is 1200° F., the stored energy would be 600 Btuh/ft.$^2$ or 0.5 Btuh/ft$^2$/° F. It is important to maintain sufficient thermal inertia for combustion and vaporization of the juices, but extremes in the amount of thermal energy stored in the emitter will result in longer times to heat the emitter to operating temperatures, and an excessive delay will be incurred in changing from one energy level of the emitter to another.

In addition, the infrared emitter generally is of a size and shape such that its total area can extend over and ideally beyond the dimensions of the burner plates to cover the external upper surface area of the burner assembly, and can extract additional energy from the heat source as the hot gases from the combustion process flow come into contact with the underside surface of the infrared emitter. In an infrared radiant burner, such as used in U.S. Pat. No. 4,321,857 to Best, the exhaust gases leave the surfaces of the burner at a higher temperature than the burner surface. Thus, the present invention allows additional energy to be absorbed into the infrared emitter by holding the hot gases of combustion under the surface of the emitter for a longer time. This allows for more energy to be extracted from the combustion of the gases over a larger surface, providing increased efficiencies in the generation/radiation of infrared radiant energy, as well as lowering the temperature of the gases, decreasing the drying tendency of the gases. Further, if a thermal radiant burner of the type described above is used and the upper emitting surface of the burner assembly is the source for the emission of thermal radiation, and if an infrared radiant emitter consisting of a glass or glass ceramic plate is placed above the burner assembly to absorb and reradiate infrared radiant energy, and when the emitting plate is placed relatively close to the thermal radiant burner, a pressure drop is created between the burner surface and the infrared emitter plate. This equalizes the plenum mixture pressure, which better distributes the gas air mixture over the burner surface eliminating the need of baffles, and enhances the turndown ratio of the burner.

In addition, by covering with the infrared emitter a large percentage of the surface area of the burner plates onto which the fats and juices otherwise could fall, i.e., the area of the glass emitter can be equal to the area of the grid supporting the food or somewhat less, the infrared emitter entirely covers the burner plates, while providing a hot surface on which most of the juices and fats would fall. The present invention has provided the advantages discussed, when the glass emitter extended approximately one inch beyond all sides of the burner. This is accomplished by allowing the area of the glass to exceed the area of the heat source, and the glass that extends around the heat source is heated by the hot products of combustion flowing under and in close proximity to the underside of the glass emitter. As a result the oils and liquids will be vaporized, which vapors are directed back toward the food to impart additional flavor to the food. Substantially covering the burner assembly with the glass/ceramic-glass infrared emitter also protects the burner assembly from wind, which renders the burner assembly substantially windproof. In tests, a single burner with the glass type of emitter was operated in a wind stream of over 4,000 ft/min without substantial negative results observed on the combustion process.

The infrared emitter of the present invention also can be formed from multiple pieces of glass/ceramic-glass. Further the surface of the emitter can be oriented at an angle, either front-to-back or side-to-side with respect to the grid supporting the food. This enables the most intense infrared radiation to be angled with respect to the food supporting grid, which can assist in providing energy at the grid surface that is more uniform in certain instances, and can help direct the infrared radiant energy at an angle away from the operator standing immediately in front of the grill. Since the maximum intensity of the infrared energy leaves normal to the surface, and the other energy diminishes as the co-sign of the angle from the normal. Placing the emitting surface at an angle to the grid can control the angle at which the maximum radiant intensity intercepts the bottom of the cooking grid.

As FIG. 1 illustrates, a cooking grid 70 is received at the open upper end 21 of the grill body at the cooking area 23. The cooking grid 70 includes one or more grates 71, typically formed from steel or similar heat resistant material. Preferably, the grates also can be formed from a corrosion resistant material. The grates include a series of spaced bars 72 or U-shaped channels with gaps 73 defined therebetween to enable juices, etc. to pass. The grates support the foods being cooked in a spaced relationship above the infrared emitter so that the food is impinged and heated by infrared radiant energy, 50% or more of which is at wavelengths of 3 microns or greater, to sear the outside of the foods and cook the foods from the outside toward the center. An optional warning rack 74 also can be mounted above the cooking grids as desired.

Louvers 76 (FIG. 2) are formed in the front panel 14 of the grill body to provide an entrance and egress into and out of the grill body for cooling air and air for combustion. Similarly, louvers 77 are formed in the hood 26 (FIG. 1) for allowing heated air to pass into the cooking chamber to enable the escape of heat and by-products of combustion. A removable grease tray 78 (FIG. 2) is slidably received within the grill body, movable between an exposed position (shown in FIG. 2) and an operative position below the burner body and cooking chamber to enclose the lower end of the grill body and to receive and catch grease and debris. Spaces formed between the cabinet and grease tray also allow for the ingress of air for combustion and cooling.

In operation of the cooking apparatus and heating assembly 10 of the present invention, a combustible mixture of air and gas is supplied to the burner chamber 41 (FIG. 2) through the venturi tube 51 and gas supply line. The combustible mixture passes through the ports 47 of the burner plates 46 to the upper surface 48, where it is ignited and burned to generate heat energy. Such heat energy is in the form of conducted heat energy, convective heat energy and infrared radiant heat energy or any combination thereof from the ceramic burner plates. Alternatively, if electric heating coils are used, the coils (not shown) are energized to generate heat energy.

The infrared emitter 33 absorbs the heat energy generated by the burner assembly, which causes the infrared emitter to be heated to approximately 300° F. to 1350° F. or greater. The infrared emitter then emits radiated heat energy upwardly toward food supported on cooking grates 71. Approximately 80–85% of the infrared radiant energy absorbed from the radiant burner assembly is re-radiated to the food being cooked at increased wavelengths. Approximately 50% or more of this infrared radiant energy is emitted at wavelengths of 3 microns or greater, with the average emissivity of the infrared emitter being approximately 0.8 or greater over the range of wavelengths emitted. As the infrared radiant energy impinges the food on the cooking grates, the relatively long wavelengths of the radiated infrared energy emitted tend to sear the outside of the food to lock in juices. The outer surface of the food further absorbs the heat of the emitted infrared energy, which heat is thereafter conducted inwardly toward the center of the food. As a result, the food is substantially evenly cooked from the outside in, to lock in the juices and evenly cook the food. In addition, as juices, fats, oils and other debris drop through the recesses or gaps of the cooking grates onto the infrared emitter, such juices, etc. are vaporized, which vapors pass back over the food to impart an outdoor flavor to the food.

The present invention can be used for cooking foods at varying rates and heats, from rapid searing/cooking to very slow roasting/cooking, during which time the food can be basted with liquids at various intervals. During such varying cooking processes, the infrared radiant energy level at the plane of the foods, primarily meat, will be varied. For example, during slow roasting processes, the infrared radiant energy level can be very low, about 2,000 Btuh/ft². The grill of the present invention also enables high levels of infrared energy to be generated at the cooking plane of the food. Such high levels of infrared energy are required in many commercial cooking applications, especially when it is a requirement of the grill to be capable of blackening meat, and can be as high as 14,000 Btuh/ft².

Investigations have shown that in most circumstances, it is not desirable to use high intensity infrared energy emitters at short wavelengths for cooking food, especially meat. Experiments have been conducted using an electric infrared energy emitting heater, as disclosed in U.S. Pat. No. 4,207,456 to Best, which is capable of generating infrared energy from the emission surface over 2400° F. The wavelength at the maximum energy output for this heating element is about 1.85 microns. Experiments comparing the operation of such a heating element at the higher energy levels to the infrared emitter at surface temperatures of about 1300° F. reveal that the cooking of meat was more efficient at lower wavelengths using the infrared emitter of the present invention, which emitted approximately 50% or more of the infrared energy wavelengths of approximately 3 microns or greater.

Judging that a cooking process is somewhat subjective, during a period of about six months a series of tests were conducted during which, more than 4,000 lbs. of meat was cooked. During these tests, the infrared emitters were spaced to provide an energy level at the cooking grid of about 10,000 Btuh/ft². A glass specimen was coated with a high temperature coating capable of operating at 1200° F. This coating blocked any transmission of the infrared radiant energy, and the total infrared radiant energy emitted form the glass surface was due to its own temperature and emissivity. When the flux density (energy level) of the infrared radiant energy from the glass surface was measured, it was the same as when there was no blockage of the transmitted infrared radiant energy. These experiments demonstrate that in the present invention, the infrared radiant energy absorbed into the emitting element can be re-radiated by the emitting element at about the same efficiency as it can be transmitted.

These tests further demonstrate that when an infrared radiant energy type of heating source is used for heating the glass, the infrared emitter generates or re-radiates most of its infrared radiant energy at wavelengths greater than 3 microns, with less than approximately 15% of the total infrared energy from the emitting source being transmitted by the glass. For example, the total infrared energy emitted from the glass, when the glass is operated at a temperature of 1140° F. is approximately 10,000 Btuh/ft², and the transmitted energy is only about 1,500 Btuh/ft² of this total.

Further, because of the wide range of use for the grill of this invention, the band of wavelengths that characterize the emitted infrared energy varies depending on use and adjusted energy input to the heating source. When the grill is adjusted for the emitting surface to operate at rather low temperatures (less that 600° F.), more then 95% of the energy will be emitted at wavelengths longer than 3 microns. Also, in applications requiring much higher generation of infrared radiant energy output, the energy emitted at 3 microns and greater can be reduced. When a broiler is adjusted to its maximum energy level, at least 50% of the infrared energy (thermal radiation) at the plane of the grid that supports the food, generally is emitted at wavelengths greater than 3 microns.

The concept of a radiant emitter consisting of a heating source and incorporating a glass or a glass ceramic type of emitting surface offers many benefits to the cooking process, especially meat. The infrared emitter as described in this invention, however, offers many benefits to other heat transfer applications. As an example, this design is ideally suited for building infrared radiant paper dryers. Quite often, it is necessary to extinguish flames associated with the drying of paper. This design provides a method by which the burner can be substantially waterproof. It could be built so that it could effectively prevent the entrance of water from the bottom, in order to protect the ceramics from water sprayed from below. Experiments have been conducted using this type of design for an outdoor radiant heater. The advantage of this concept over traditional radiant burners, is that again it can be made to be substantially waterproof and windproof.

It will be understood by those skilled in the art that while the present invention has been disclosed with respect to preferred embodiments thereof numerous modifications, changes and additions can be made thereto without departing from the spirit and scope of the present invention as set forth in the following claims.

What is claimed is:

1. A grill assembly, comprising:

a body defining an open ended chamber;

a heating element positioned within said chamber of said body to generate heat energy;

a food support member received within said chamber at a position spaced from said heating element for supporting items of food in a spaced relationship to said heating element for cooking; and an infrared energy emitter positioned between said food support member and said heating element, spaced from said heating element, for absorbing heat energy generated by said heating element and substantially uniformly emitting at least 50% infrared radiant energy at wavelengths of at least 3 microns toward said food support member for cooking the items of food thereon.

2. The grill assembly of claim 1 and wherein said infrared energy emitter comprises a silica glass material.

3. The grill assembly of claim 1 and wherein said infrared energy emitter is formed from a ceramic-glass material.

4. The grill assembly of claim 1 and wherein said infrared energy emitter has an emissivity of at least approximately 0.8.

5. The grill assembly of claim 1 and further including a source of combustible gas and wherein said heating element comprises a gas burner assembly.

6. The grill assembly of claim 1 and wherein said heating element comprises an electric heater.

7. The grill assembly of claim 5 and wherein said gas burner assembly comprises a ceramic radiant gas burner element.

8. The grill assembly of claim 1 and further including a cabinet supporting said body, and a hood mounted to said body and movable from a closed position over said chamber to an open position displaced from said body to enable access to said chamber and said food support member.

9. The grill assembly of claim 1 and wherein said infrared energy emitter includes a substantially solid glass surface and wherein said infrared energy emitter is positioned over and substantially covers said heating element to protect said heating element from contact with fluids during a cooking process.

10. A grill for cooking foods, comprising:

a grill body defining a cooking area;

a heating element mounted adjacent said cooking area for supplying heat energy within said cooking area;

a support rack positioned within said cooking area spaced from said heating element for supporting the food being cooked in a spaced relationship to said heating element; and an infrared energy emitter comprised of a glass, ceramic glass or glass coated material and mounted adjacent said heating element and adapted to receive heat energy from said heating element and re-radiate infrared radiant energy of at least 2,000 BTUH/FT$^2$/° F. for cooking the food, wherein at least 50% of the infrared energy emitted is at wavelengths of at least 3 microns.

11. The grill of claim 10 and wherein said infrared energy emitter has an emissivity of at least approximately 0.8.

12. The grill of claim 10 and further including a source of combustible gas and wherein said heating element comprises a gas burner assembly.

13. The grill of claim 12 and wherein said gas burner assembly includes a ceramic radiant burner element.

14. A cooking apparatus for cooking foods, comprising:

a heating element;

an infrared radiant energy emitter spaced from said heating element and heated by the absorption of energy generated by said heating element, wherein said infrared radiant energy emitter has an emissivity of approximately 0.8 and emits infrared radiant energy, at least 50% of which is emitted at wavelengths of at least 3 microns; and a food support grid spaced from said infrared radiant energy emitter for supporting the foods being cooked in a spatial relationship to said infrared radiant energy emitter.

15. The cooking apparatus of claim 1 and wherein said infrared radiant element absorbs infrared energy, conducted heat energy or convective heat energy from said heating element.

16. The cooking apparatus of claim 14 and wherein said heating element comprises an electric heater.

17. The cooking assembly claimed in claim 14 and wherein said heating element comprises a gas fired infrared burner having a ceramic radiant burner element, said radiant burner element including a plurality of passageways through which combustible gases pass for burning on said ceramic element to generate infrared radiant energy and products of combustion to heat said infrared radiant energy emitter.

18. The cooking assembly claimed in claim 14 and wherein said infrared radiant energy emitter comprises a glass capable of storing between 0.2 BTUH/FT$^2$/° F. and 1 BTUH/FT$^2$/° F.

19. The cooking assembly claimed in claim 14 and wherein said infrared radiant energy emitter comprises a glass material capable of continuous operation at 900° F.

20. The cooking assembly claimed in claim 14 and wherein said infrared radiant energy emitter comprises a ceramic-glass material capable of continuous operation at 900° F.

\* \* \* \* \*